United States Patent
Yang et al.

(10) Patent No.: US 10,385,873 B2
(45) Date of Patent: Aug. 20, 2019

(54) FAN

(71) Applicant: DELTA ELECTRONICS, INC., Taoyuan (TW)

(72) Inventors: Shu-Cheng Yang, Taoyuan (TW); Ya-Ting Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 506 days.

(21) Appl. No.: 15/141,284

(22) Filed: Apr. 28, 2016

(65) Prior Publication Data

US 2017/0191501 A1    Jul. 6, 2017

(30) Foreign Application Priority Data

Dec. 30, 2015    (CN) .................... 2015 2 1131572 U

(51) Int. Cl.
| | |
|---|---|
| *F04D 29/58* | (2006.01) |
| *F04D 25/06* | (2006.01) |
| *F04D 25/08* | (2006.01) |
| *F04D 29/28* | (2006.01) |
| *F04D 29/30* | (2006.01) |
| *F04D 29/66* | (2006.01) |
| *F04D 17/16* | (2006.01) |
| *G06F 1/20* | (2006.01) |

(52) U.S. Cl.
CPC ......... *F04D 29/5826* (2013.01); *F04D 17/16* (2013.01); *F04D 25/06* (2013.01); *F04D 25/08* (2013.01); *F04D 29/281* (2013.01); *F04D 29/30* (2013.01); *F04D 29/582* (2013.01); *F04D 29/663* (2013.01); *G06F 1/20* (2013.01)

(58) Field of Classification Search
CPC ....................................... F04D 29/66
See application file for complete search history.

(56) References Cited

U.S. PATENT DOCUMENTS

| | | | | |
|---|---|---|---|---|
| 2,362,514 A | * | 11/1944 | Warner | F04D 29/284 415/119 |
| 5,595,473 A | * | 1/1997 | Nagaoka | F04D 29/2216 415/199.1 |
| 2009/0008067 A1 | * | 1/2009 | Kuan | F04D 29/281 165/121 |
| 2010/0220439 A1 | * | 9/2010 | Qin | G06F 1/203 361/679.47 |

* cited by examiner

*Primary Examiner* — Justin D Seabe

(74) *Attorney, Agent, or Firm* — Muncy, Geissler, Olds & Lowe, P.C.

(57) ABSTRACT

A fan includes a hub, a plurality of blades, and a heat dissipation module. The blades surround the hub. The heat dissipation module includes a plurality of fins. The fins are disposed around the hub with respect to the blades. The end face of each fin facing the blades includes a noise reduction structure. The noise reduction structure is an inclined plane.

11 Claims, 4 Drawing Sheets

FAN

CROSS REFERENCE TO RELATED APPLICATIONS

This Non-provisional application claims priority under 35 U.S.C. § 119(a) on Patent Application No(s). 201521131572.X filed in People's Republic of China on Dec. 30, 2015, the entire contents of which are hereby incorporated by reference.

BACKGROUND OF THE INVENTION

Field of Invention

The invention relates to a fan.

Related Art

Recently, the volumes of laptops become thin and compact. The reduction in the interior space influences the available space of the heat dissipation fan. Thus, it is important to improve the performance of the fan in a limited space. Conventional centrifugal fans are designed with an air outlet at one side and a pressurized channel at the other side. Because the space inside a laptop available for the heat dissipation module is narrow, the heat dissipation area is insufficient to take away the heat generated by the system, and the space around the fan cannot be efficiently utilized.

SUMMARY OF THE INVENTION

A fan according to the disclosure includes a hub, a plurality of blades, and a heat dissipation module. The blades surround the hub. The heat dissipation module includes a plurality of fins. The fins are disposed around the hub with respect to the blades. The end face of each fin facing the blades includes a noise reduction structure. The noise reduction structure is an inclined plane.

In one embodiment, an extension line of a windward side of the noise reduction structure and an extension line of a central axis of the hub have an included angle.

In one embodiment, the included angle is between 8 degrees and 45 degrees.

In one embodiment, the fins are disposed around the hub at a non-zero angle with respect to a radial direction of the hub.

In one embodiment, the fan further includes a base, and the base supports the heat dissipation module.

A fan according to the disclosure includes a hub, a plurality of blades, and a heat dissipation module. The blades surrounds the hub. The heat dissipation module includes a plurality of fins. The fins are disposed around the hub with respect to the blades. The end face of each fin facing the blades includes a noise reduction structure. The noise reduction structure includes at least a concave portion.

In one embodiment, the fins are disposed around the hub at a non-zero angle with respect to a radial direction of the hub.

In one embodiment, the fan further includes a base, and the base supports the heat dissipation module.

A fan according to the disclosure includes a hub, a plurality of blades, and a heat dissipation module. The blades surrounds the hub. The heat dissipation module includes a plurality of fins. The fins are disposed around the hub with respect to the blades. The end face of each fin facing the blades includes a noise reduction structure. A minimum distance between the noise reduction structure and each blade is between 7% and 20% of the radius of each blade.

In one embodiment, the fins are disposed around the hub at a non-zero angle with respect to a radial direction of the hub.

In one embodiment, the fan further includes a base, and the base supports the heat dissipation module.

As mentioned above, the fan according to the disclosure includes the noise reduction structure. The noise reduction structure which is designed with, for example, an inclined plane allows the same noise reduction structure to have unequal distances from the end of the same blade. Accordingly, compared with the conventional fan, when the fan according to the disclosure operates, the pressure of the air flow between the blades and the fins is decreased to reduce the frequency of the blades. Thus, the noise generated during the fan operation can be reduced. In addition, the arrangement of fins around the hub replaces the conventional channel baffle, so the space of the fan can be fully utilized to improve the overall capability of heat dissipation of the fan.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1:
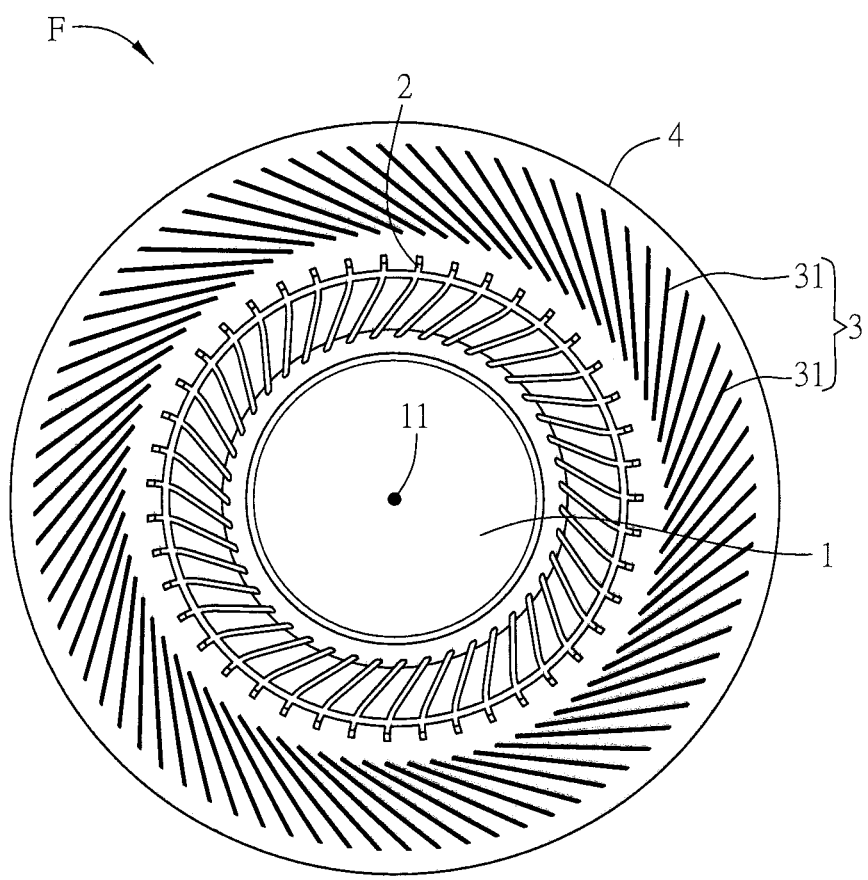
FIG. 1 is a top view of a fan according to the first embodiment.
Figure 2A:
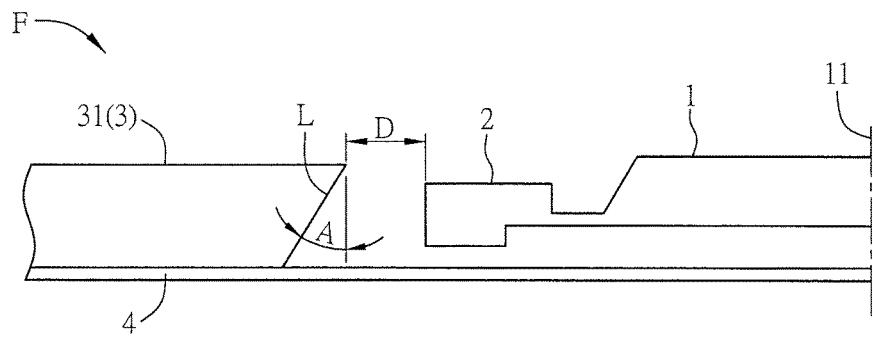
FIG. 2A is a schematic lateral view of the fan.

FIG. 1 is a top view of a fan according to the first embodiment. FIG. 2A is a schematic lateral view of the fan. Referring to FIG. 1 and FIG. 2A, a centrifugal fan is illustrated for example in the embodiment. The fan F includes a cover (not shown) and a base 4. The base 4 is opposite to the cover and supports a stator set (not shown). The stator set may include, for example but not limited to, a coil, bearing, bushing, or the like. The cover includes an air inlet so air can axially enter the fan F. Moreover, the cover is not shown in the drawings for conciseness to facilitate the illustration.

The fan F further includes a hub 1, a plurality of blades 2, and a heat dissipation module 3. The hub 1 has a central axis 11. The blades 2 surround the hub 1 and axially set on the base 4 with a rotary shaft to form a rotor set. The rotor set may further include a magnet block and other elements, but they are not described in detail in the embodiment.

The heat dissipation module 3 includes a plurality of fins 31, and the fins 31 are disposed around the hub 1 with respect to the blades 2. The heat dissipation module 3 is disposed around at least a part of the hub 1. In the embodiment, the fins 31 are evenly distributed around the hub 1 at a non-zero angle with respect to a radial direction of the hub 1.

The end face of each fin 31 facing the blades 2 includes a noise reduction structure L. That is to say, the noise reduction structure L is located on the end face of the fin 31 which is close to the blades 2. In the embodiment, the noise reduction structure L is an inclined plane. Namely, the extension line of the noise reduction structure L (i.e. the windward side) and the extension line of the central axis 11 of the hub 1 have an included angle A. The included angle A is preferably between 8 degrees and 45 degrees, and more preferably between 15 degrees and 30 degrees. As a result, the end face of the end of the blade 2 is not parallel to the noise reduction structure L of the fin 31. Namely, the same noise reduction structure L has unequal distances from the end of the same blade 2. Accordingly, compared with the conventional fan, when the fan F operates and makes the hub 1 drive the blades 2 to rotate, the pressure of the air flow between the blades 2 and the fins 31 is decreased to reduce the frequency of the blades. Thus, the noise generated during the fan F operation can be reduced. In addition, the arrangement of fins 31 replaces the conventional channel baffle, so the space of the fan F can be fully utilized to improve the overall capability of heat dissipation of the fan F.

Moreover, a minimum distance D between the noise reduction structure L and each blade 2 is between 7% and 20% of the radius of each blade 2. The radius of the blade is the distance between the central axis 11 and the end of the blade 2. If the minimum distance D is less than the above-mentioned range, the capability of noise reduction is reduced. If the minimum distance D is greater than the above-mentioned range, it is difficult for an air flow to flow into the space between the fins 31 so as to possibly generate a turbulence flow in the space between the fins 31 and the blades 2. Accordingly, the design of the above-mentioned range can optimize the overall performance of the fan F.

Figure 2B:
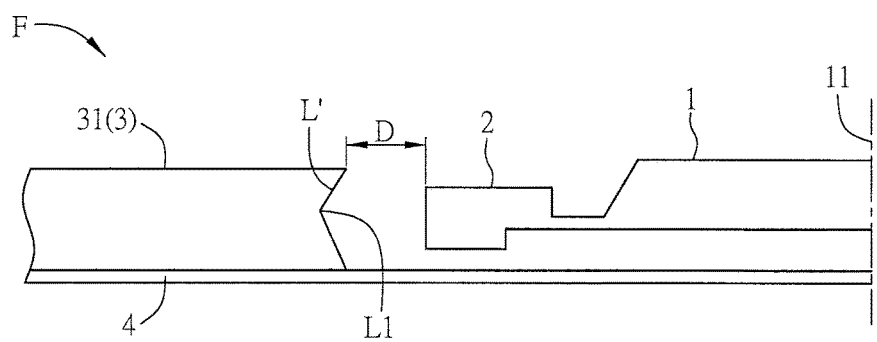
FIG. 2B and FIG. 2C are schematic diagrams of the noise reduction structures of other implementations.
Figure 2C:
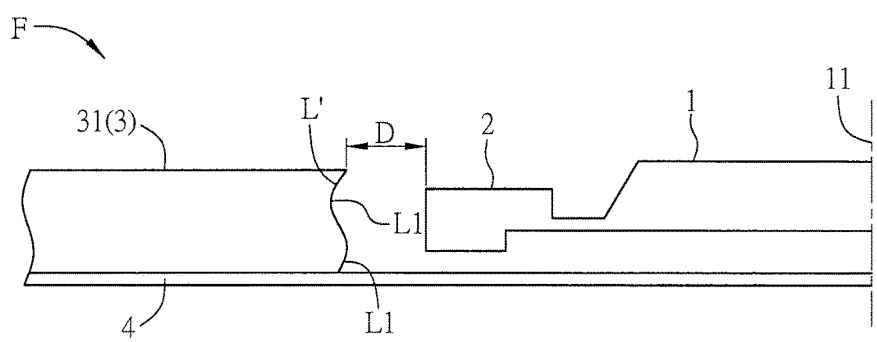

FIG. 2B and FIG. 2C are schematic diagrams of the noise reduction structures of other implementations. Referring to FIG. 2B and FIG. 2C, in these implementations, the noise reduction structure L' includes at least a concave portion L1, and the concave portion L1 is recessed in a direction away from the blades 2. For example, FIG. 2B shows a concave portion L1, and FIG. 2C shows two concave portions L1. Similarly, the concave portion L1 allows the same noise reduction structure L' to have unequal distances from the end of the same blade 2 to reduce the frequency of the blades. Thus, the noise generated during the fan F operation can be reduced. Similarly, the minimum distance D between the noise reduction structure L' and the blade 2 is between 7% and 20% of the radius of each blade 2. Because the details can refer to the above description, they are not repeated here.

Figure 3:
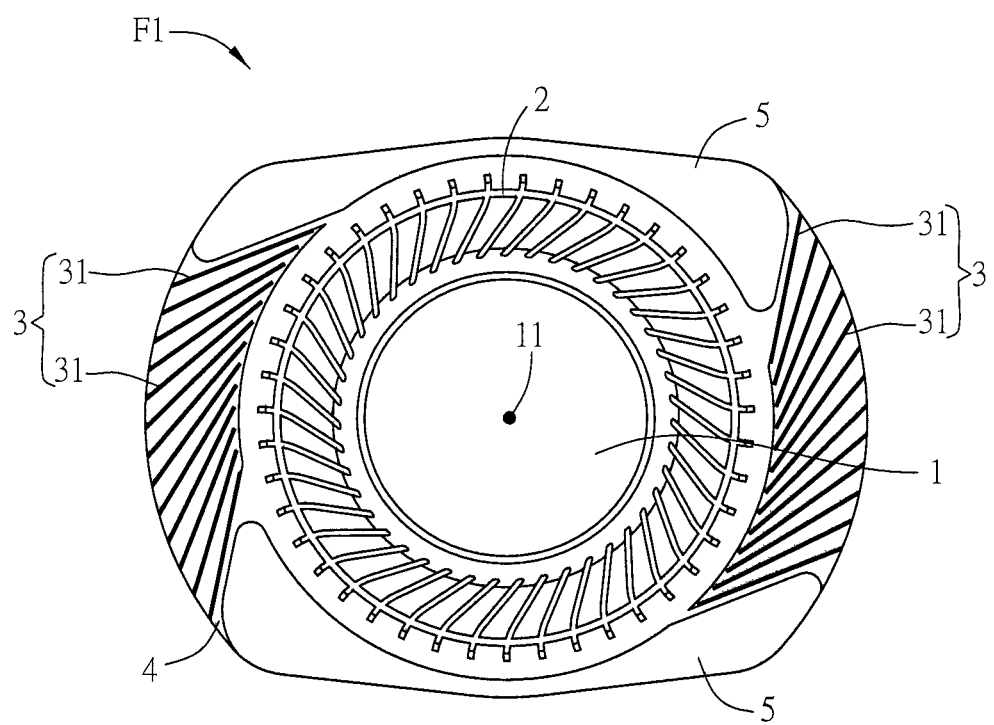
FIG. 3 is a top view of a fan according to the second embodiment.

Referring to FIG. 3, it is a top view of a fan according to the second embodiment. In the embodiment, the heat dissipation module 3 of the fan F1 is disposed on opposite sides of the hub 1, and it is disposed symmetrically with respect to the central axis 11 of the hub 1 as a center of symmetry. The fins 31 are arranged around the hub 1. Moreover, the fan F1 of the embodiment may further include two stop portions 5 which are disposed around the hub 1 together with the heat dissipation module 3. The stop portions 5 and the heat dissipation module 3 surround the hub 1 alternately. Because the description of the heat dissipation module 3 can refer to the above embodiment, it is not repeated here.

Figure 4:
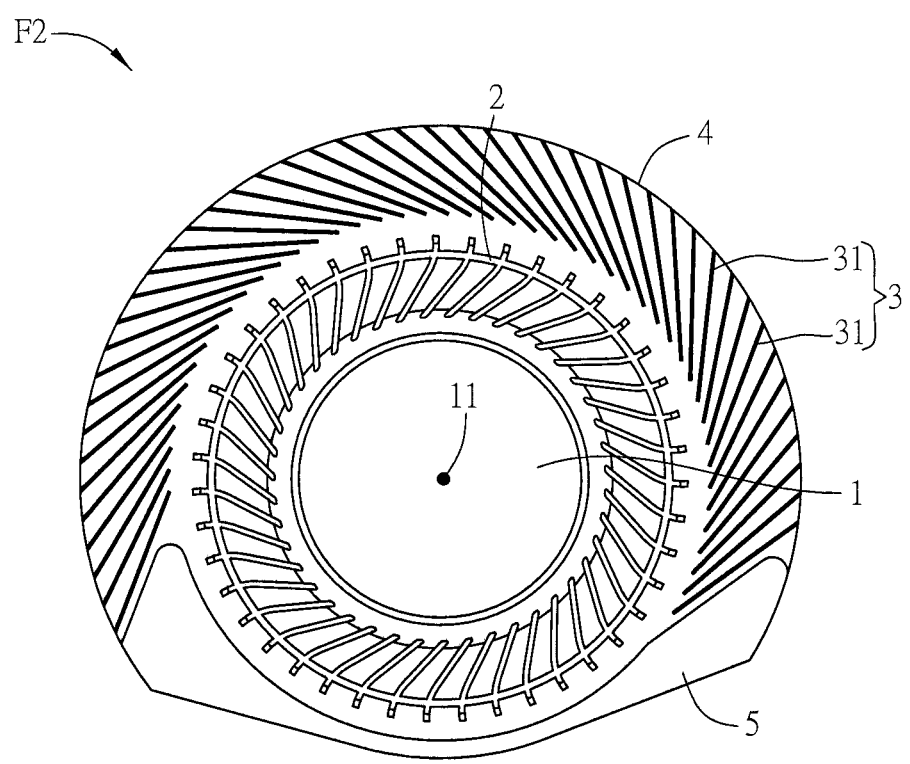
FIG. 4 is a top view of a fan according to the third embodiment.

Referring to FIG. 4, it is a top view of a fan according to the third embodiment. In the embodiment, the heat dissipation module 3 of the fan F2 is distributed unevenly around the hub 1 and disposed around the hub 1 together with a stop portion 5. Similarly, the details of other elements may refer to the above embodiments, so they are not repeated here.

In summary, the fan according to the disclosure includes the noise reduction structure. The noise reduction structure which is designed with, for example, an inclined plane allows the same noise reduction structure to have unequal distances from the end of the same blade. Accordingly, compared with the conventional fan, when the fan according to the disclosure operates, the pressure of the air flow between the blades and the fins is decreased to reduce the frequency of the blades. Thus, the noise generated during the fan operation can be reduced. In addition, the arrangement of fins around the hub replaces the conventional channel baffle, so the space of the fan can be fully utilized to improve the overall capability of heat dissipation of the fan.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fan, comprising:
   a hub;
   a plurality of blades surrounding the hub; and
   a heat dissipation module including a plurality of fins disposed around the hub with respect to the blades;
   wherein an end face of each fin facing the blades includes a noise reduction structure, and a minimum distance between the noise reduction structure and each blade is between 7% and 20% of the radius of each blade.

2. The fan according to claim 1, wherein the noise reduction structure includes at least a concave portion.

3. The fan of claim 2, wherein the fins are disposed around the hub at a non-zero angle with respect to a radial direction of the hub.

4. The fan of claim 2, wherein the fan further comprises a base, and the base supports the heat dissipation module.

5. The fan of claim 1, wherein the fins are disposed around the hub at a non-zero angle with respect to a radial direction of the hub.

6. The fan of claim 1, wherein the fan further comprises a base, and the base supports the heat dissipation module.

7. The fan of claim 1, wherein the noise reduction structure is an inclined plane not parallel to an end face of the blade.

8. The fan of claim 7, wherein an extension line of a windward side of the noise reduction structure and an extension line of a central axis of the hub have an included angle.

9. The fan of claim 8, wherein the included angle is between 8 degrees and 45 degrees.

10. The fan of claim 7, wherein the fins are disposed around the hub at a non-zero angle with respect to a radial direction of the hub.

11. The fan of claim 7, wherein the fan further comprises a base, and the base supports the heat dissipation module.

* * * * *